April 1, 1958 E. A. LEAVENGOOD ET AL 2,829,002
SEAT POSITIONING MECHANISM
Filed Sept. 15, 1955 3 Sheets-Sheet 1

INVENTORS
Ernest A. Leavengood, &.
BY Donald W. Severance

Paul Fitzpatrick
ATTORNEY

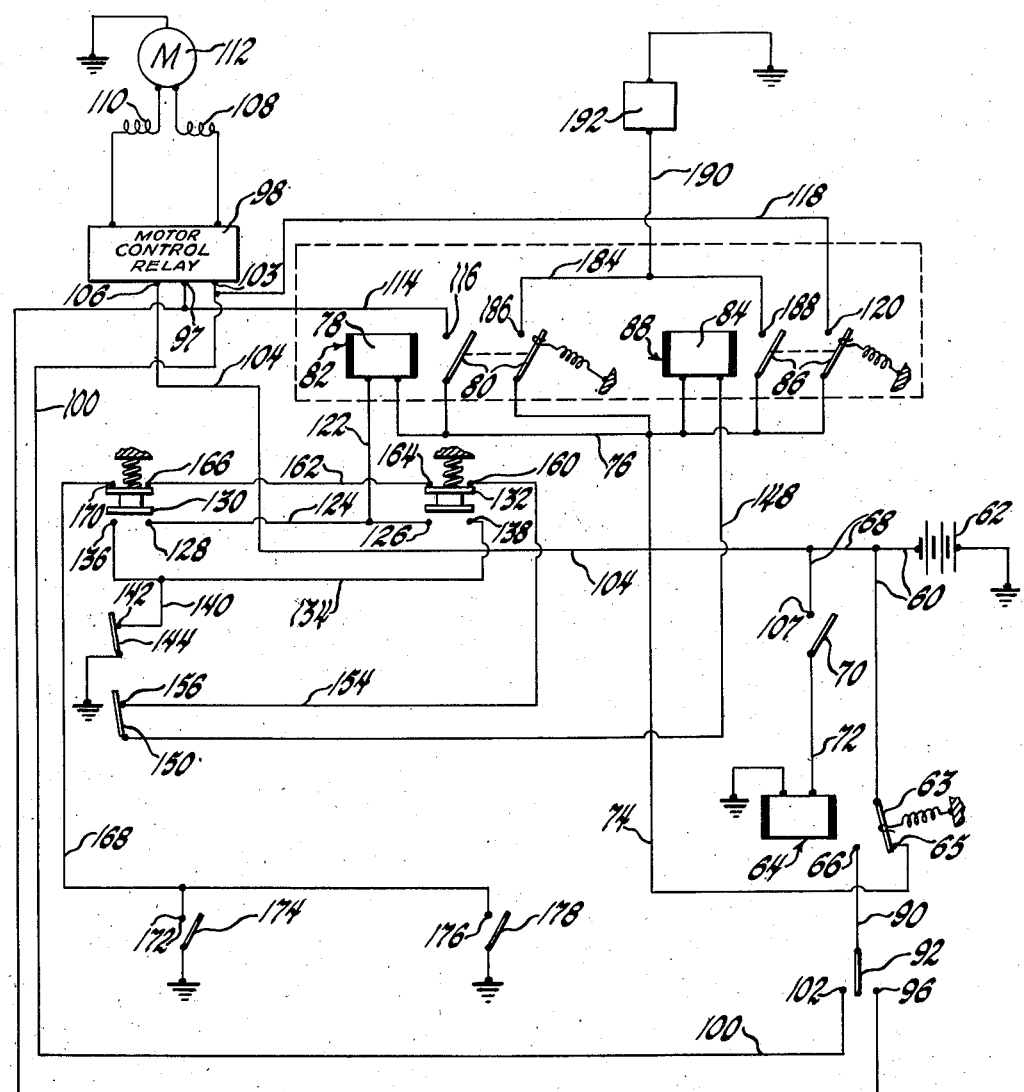

United States Patent Office 2,829,002
Patented Apr. 1, 1958

2,829,002

SEAT POSITIONING MECHANISM

Ernest A. Leavengood and Donald W. Severance, Lansing, Mich., assignors to General Motors Corporation, Detroit, Mich., a corporation of Delaware Application September 15, 1955, Serial No. 534,522

6 Claims. (Cl. 296—65)

This invention relates to a seat positioning mechanism and more particularly to a vehicle seat positioning mechanism which facilitates entrance and exit of the driver and passengers.

The seat positioning mechanism of this invention is intended primarily for use in two-door vehicle body styles having a rear seat and a power operated horizontally movable front seat including a tiltable seat back. In the preferred embodiment of this invention, the seat positioning mechanism interconnects the horizontal power operating mechanism for the front seat with the vehicle doors and the tiltable seat back. Movement of either or both vehicle doors to open position causes the seat to be moved horizontally rearwardly to facilitate entrance and exit of the driver and front seat passenger, and tilting movement of the seat back, or of either or both seat backs if the front seat is of the split back type, causes the seat to be moved horizontally forward to facilitate entrance and exit of a rear seat passenger whether the doors are open or closed.

The primary object of this invention is to provide a vehicle seat positioning mechanism which facilitates entrance and exit of front and rear seat passengers. A more specific object of this invention is to provide a vehicle front seat positioning mechanism for use in vehicle bodies having a rear seat and power operated horizontally movable front seat including a tiltable seat back.

These and other objects of this invention will be readily apparent from the following specification and drawings, in which:

Figure 4 is a circuit diagram of a modified seat positioning mechanism according to this invention.

Figure 1:
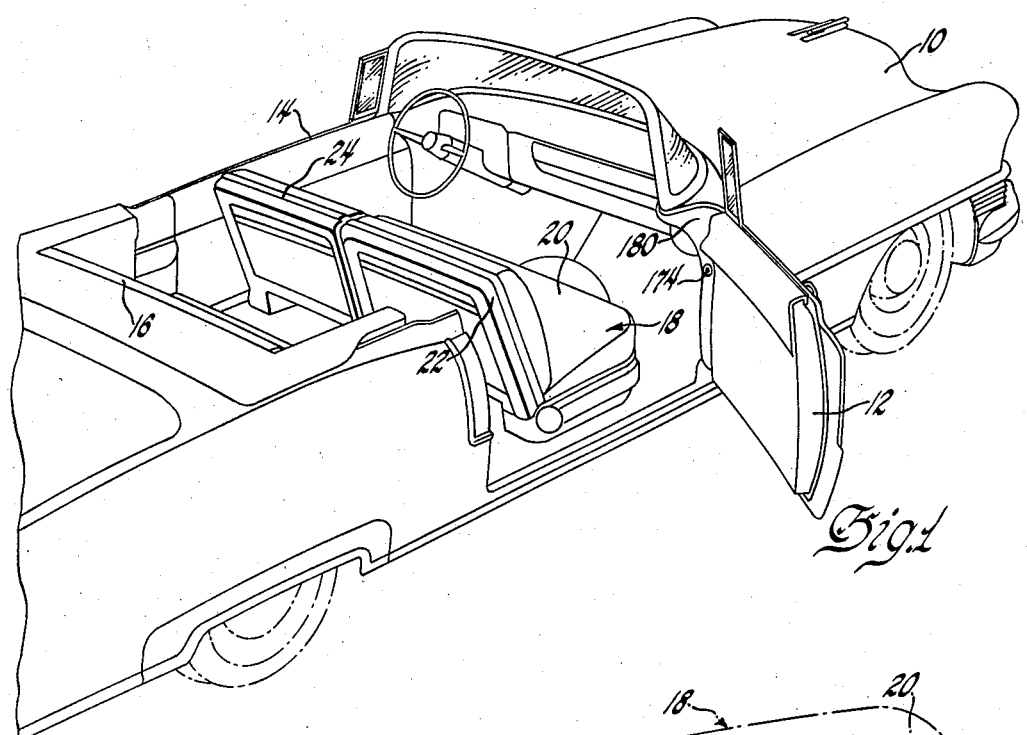
Figure 1 is a perspective view of a vehicle embodying a seat positioning mechanism according to this invention.
Figure 2:
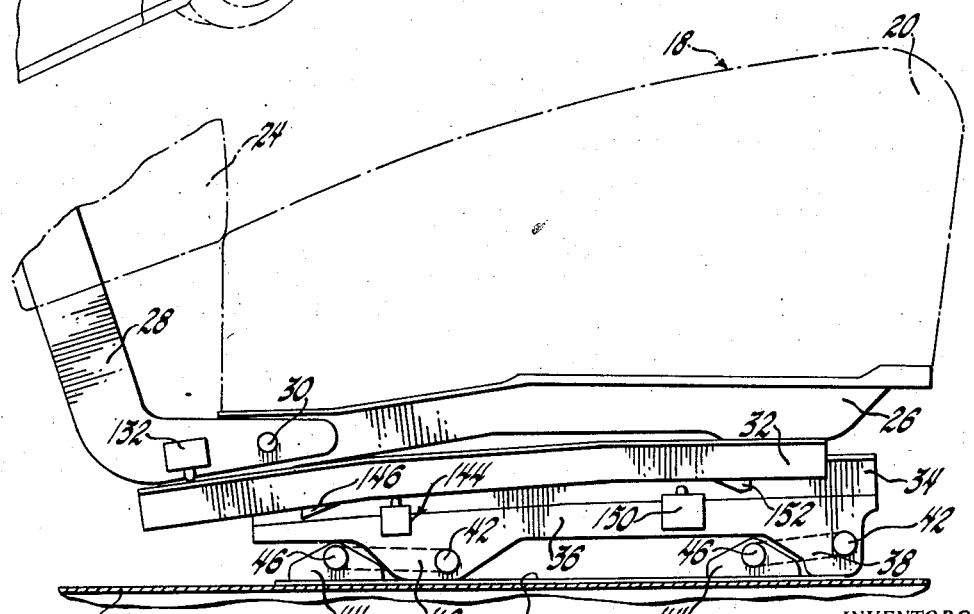
Figure 2 is a partial side elevational view of the front seat of the vehicle shown in Figure 1.

Referring now to Figures 1 and 2 of the drawings, vehicle 10 includes front right hand and left hand doors 12 and 14, respectively, a rear seat 16, and a front seat 18 including a seat cushion 20 and right and left hand seat backs 22 and 24, respectively. The seat cushion 20 is mounted on a support 26 and the seat backs 22 and 24 are mounted in frames 28 pivoted on support 26 at 30 to permit the seat backs to move from a substantially upright position to a position overlying the seat cushion. The seat shown is of the split back type which is commonly used in two-door body styles. In this type of seat, the seat back is split in the middle of the seat or to one side of the middle of the seat and each seat back portion is independently tiltable from an upright position to a position overlying the seat cushion. The seat adjusting mechanism includes an upper track member 32 secured to support 26 and supported on a lower track member 34 by means of ball bearings or other suitable anti-friction means. The lower track 34 is secured to base 36 supported at either end by yokes 38 and 40 pivoted to the base at 42 and to brackets 44 at 46. Brackets 44 are fixed to a support 48 which is fixed to the vehicle floor pan 50. The seat adjusting mechanism is the same on both sides of the seat and, therefore, only one such mechanism has been shown and described.

The upper and lower track members allow the seat to be moved horizontally forwardly and rearwardly with respect to the vehicle body. While any known type of power operating mechanism can be employed, a suitable power operating mechanism for moving the seat forwardly and rearwardly is shown in S. N. 395,822, filed December 2, 1953, Louis P. Garvey et al., assigned to the assignee of the present invention. Since the power operating mechanism forms no part of the present invention, reference may be had to the above application for a full and complete description of a suitable mechanism. The power operated mechanism shown in this application includes seat motors for moving the seat both horizontally and vertically. However, it should be noted that the seat positioning mechanism of this invention may be used in conjunction with any vehicle seat which is power operated horizontally by a seat motor regardless of whether the seat is power operated vertically or in any other manner.

The seat positioning mechanism of this invention includes an electrical circuit interconnecting the seat motor for moving the seat horizontally with the vehicle doors, the tilting seat backs of the front seat, and with the vehicle ignition switch. When either or both of the vehicle doors is opened, the seat positioning mechanism actuates the seat motor to move the seat rearwardly to allow the driver and front seat passenger to easily leave the vehicle and to thereafter easily enter the vehicle. Tilting of either or both of the seat backs causes the seat positioning mechanism to actuate the seat motor to move the seat forwardly to allow the rear seat passenger to easily leave the vehicle and to thereafter easily enter the vehicle. In both instances, the driver moves the seat to the desired driving position after he enters the vehicle, since the seat positioning mechanism does not function to return the seat to its initial starting position.

Figure 3:
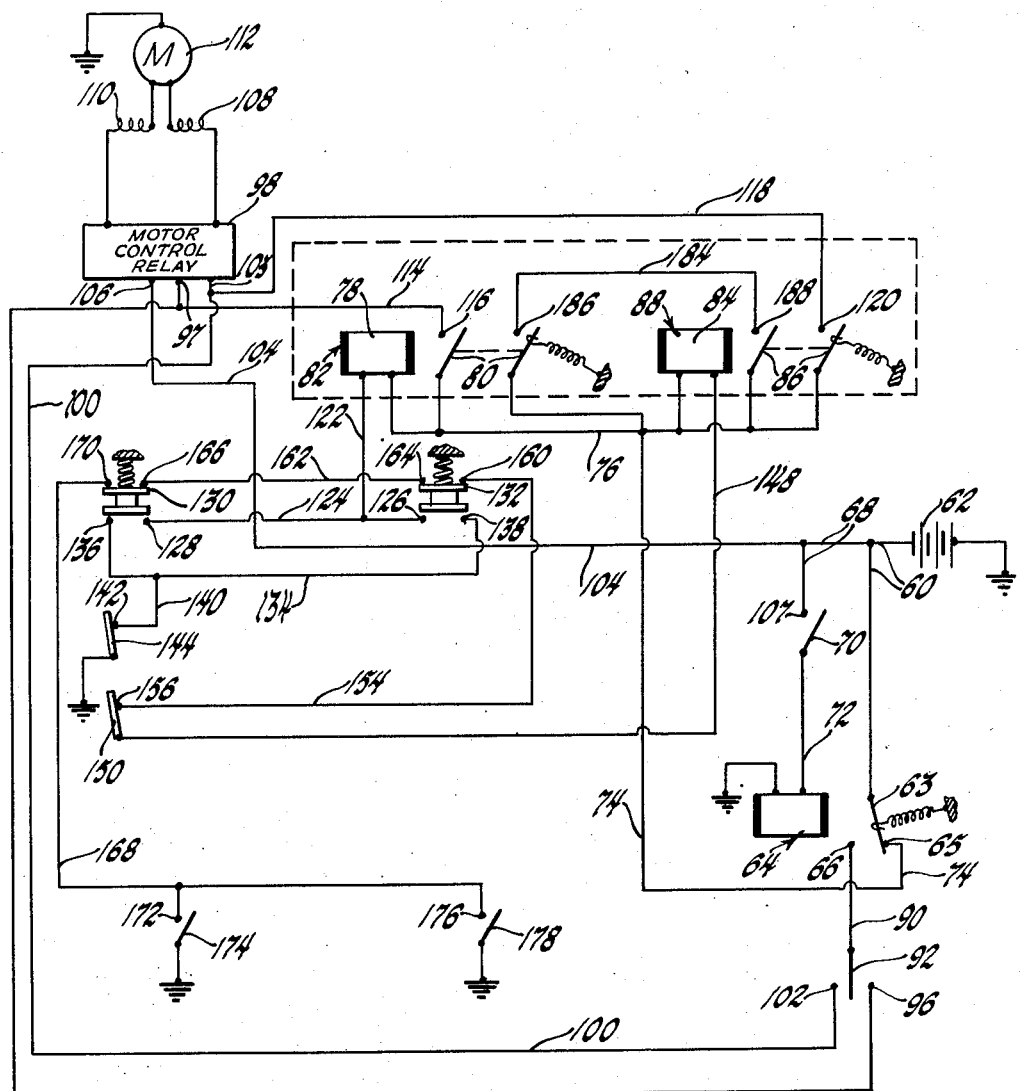
Figure 3 is a circuit diagram of the seat positioning mechanism of this invention.

Referring now to Figure 3 of the drawings, the circuit of the seat positioning mechanism will be described. Conductor 60 connects a battery or other source of power 62 with armature 63 of control relay 64 which may engage either contact 65 or contact 66. Conductor 68 extends from conductor 60 to the contact of the vehicle ignition switch 70 and conductor 72 extends from the vehicle ignition switch to the coil of the control relay 64 which is grounded. A conductor 74 extends from contact 65 to conductor 76 which is connected to the coil 78 and armature 80 of the seat back controlled relay 82 and to coil 84 and armature 86 of the door controlled relay 88. A conductor 90 extends from contact 66 to the manual seat switch 92. Conductor 94 extends from contact 96 of the manual seat switch to terminal 97 of the motor control relay 98 and conductor 100 extends from contact 102 of the manual seat switch to terminal 103 of the motor control relay. A conductor 104 extends from conductor 68 to terminal 106 of the motor control relay.

The control relay 64 is controlled by the position of the ignition switch 70. When the ignition switch is in "on" position, the control relay disconnects battery 62 from the circuit of the seat positioning mechanism and connects the battery with the circuit controlled by the manual seat switch 92. This lock out provided by the ignition switch is a necessary safety feature. Should the vehicle stop quickly and one of the front seat backs tilt forwardly, the circuit of the seat positioning mechanism is not energized to move the seat forwardly and pin the driver against the steering wheel. Likewise, if either of the vehicle doors should be opened as the vehicle is moving, the circuit of the seat positioning mechanism will not be energized to move the seat rearwardly to move the driver away from the steering wheel. The lock out will now be described.

The battery or source of power 62 is always connected with contact 107 of the ignition switch through conductors 60 and 68. When the ignition switch is in "on" position, contact 107 of the switch is connected with conductor 72 to energize the coil of relay 64 so that the relay armature 63 connects conductor 60 with contact 66. Current can then flow from battery 62 through conductor 60, armature 63, contact 66, and conductor 40 to the manual seat switch 92 which controls the circuit to the motor control relay 98. Current cannot flow from conductor 60 to contact 65 which connects the seat positioning circuit with the control relay since the relay armature 63 is out of engagement with contact 65. Thus, in the "on" position of the ignition switch, the circuit of the seat positioning mechanism cannot be energized. When the ignition switch is in "off" position, conductors 68 and 72 are not connected to energize the coil of control relay 64, and armature 63 of the control relay then engages contact 65. Current can then flow from battery 62 through conductor 60, armature 63, contact 65, conductor 74, and conductor 76 to the seat back and door controlled relays 82 and 88.

The motor control relay 98 energizes either winding 108 or winding 110 of the reversible seat motor 112 to control the direction of rotation of the motor armature and, thus, the direction of horizontal movement of the seat. Since conductor 104 is always connected with battery 62, current can always flow to the motor control relay 98 regardless of whether the relay is controlled by the manual seat switch 92 or by the circuit of the seat positioning mechanism.

As has been previously stated, conductor 76 is connected to the coil 78 and armature 80 of the seat back controlled relay 82 and to coil 84 and armature 86 of the door controlled relay 88. Conductor 114 extends from contact 116 to terminal 97 of the motor control relay and conductor 118 extends from contact 120 to terminal 103 of the motor control relay. Conductors 122 and 124 connect coil 78 of relay 82 with contacts 126 and 128 of the right hand and left hand seat back switches 130 and 132, respectively, which are double pole double throw switches actuated by tilting movement of the right hand and left hand tilting seat backs 22 and 24. Switch 130 is mounted on the right hand seat back frame 28 with its contact in engagement with the upper track 32, as shown in Figure 2, and switch 132 is mounted in the same manner on the left hand seat back frame.

A conductor 134 connects contact 136 of the right hand seat back switch with contact 138 of the left hand seat back switch, and a conductor 140 connects conductor 134 with contact 142 of the front limit switch 144 which is normally closed and grounded. Referring now to Figure 2 of the drawings, the front limit switch 144 is mounted in a suitable manner on base 36 and is opened as the seat moves forwardly by a lug 146 secured to the upper track 32. A conductor 148 extends from the coil 84 of relay 88 to the back limit switch 150 which is normally closed. Referring now to Figure 2, the back limit switch 150 is mounted in a suitable manner on base 36 and is opened as the seat moves rearwardly by a lug 152 secured to the upper track 32. A conductor 154 connects contact 156 of the back limit switch with contact 160 of the left hand seat back switch 132. A conductor 162 connects contact 164 of the left hand seat back switch with contact 166 of the right hand seat back switch 130. A conductor 168 extends from contact 170 of the right hand seat back switch to contact 162 of the right hand door jamb switch 174 which is normally open and grounded and contact 176 of the left hand door jamb switch 178 which is also normally open and grounded. The right hand door jamb switch is mounted on the right hand door jamb 180, Figure 1, and is closed when the right hand door 12 is opened. The left hand door jamb switch 178 is mounted on the left hand door jamb in the same manner as the right hand door jamb switch and is also closed as the door is opened.

The operation of the circuit of the seat positioning mechanism will now be described. Assuming that the ignition switch is in "off" position so that armature 63 of control relay 64 is in engagement with contact 65 and either or both doors is opened, a circuit will be completed as follows: Current will flow from contact 65 through conductor 74, conductor 76, coil 84 of the door controlled relay 88, conductor 148, contact 156 of the normally closed back limit switch 150, conductor 154, contact 160 of the left hand seat back switch 132, contact 164 of the switch, conductor 162, contact 166 of the right hand seat back switch 130, contact 170 of the switch, conductor 168, contacts 172 and 176 of the right and left hand door jamb switches 174 and 178, respectively, depending on whether either or both doors is opened. This will complete a circuit through the coil 84, door controlled relay 88, and the relay armature 86 will be retracted to engage contact 120 so that the motor control relay 98 will be energized through conductor 118 to start the seat motor in the desired direction of rotation. As has been previously stated, when either or both of the vehicle doors is opened, the seat will be moved rearwardly. When the seat has reached its rearward limit position, lug 152 on the upper track 32 will engage the switch contact of the back limit switch 150 to open this switch and break the circuit between conductors 148 and 154 to deenergize the coil 84 of the door controlled relay and thereby stop the motor as the solenoid armature is extended to break the circuit with contact 120. This seat will remain in its rearward position after the driver or front seat passenger leaves so that when he again enters the vehicle he can easily position himself on the seat. Since the seat is in its rearward position to open the back limit switch, opening movement of the vehicle doors when the driver or passenger reenters the vehicle will not energize the seat positioning circuit. After the driver has entered the vehicle and closed the doors, he can move the ignition switch to "on" position and then move the seat forwardly to the desired driving position by using the manual seat switch. As has been previously mentioned, movement of the ignition switch to "on" position deenergizes the circuit of the seat positioning mechanism.

Assuming now that the ignition switch is in "off" position and that either or both of the doors has been opened to allow the driver or front seat passenger to leave the vehicle. As has been previously described, the seat will move to a rearward position. If there is a rear seat passenger in the vehicle, he can tilt either or both seat backs forwardly to move the seat forwardly to allow him to easily leave the vehicle. Most current production vehicles have front door arm rests. In some of these vehicles, the front seat backs cannot be tilted forwardly until the doors are opened because of interference with these arm rests. Therefore, it will be assumed that either or both doors is opened before either or both front seat backs is tilted forwardly. When either of the front seat backs is tilted forwardly, the right hand seat back switch 130 or the left hand seat back switch 132 establishes a connection between contacts 166 and 170 or contacts 160 and 164. Current will then flow from contact 65 through conductor 76, coil 78 of the seat back controlled relay 82, conductor 122, conductor 124, contacts 126 and 128, either contact 136 or 138 or both, conductor 134, conductor 140, and contact 142 of the forward limit switch 144 which is grounded and normally closed to complete the circuit. The coil 78 of the seat back controlled relay 82 is then energized to retract armature 80 and establish current flow between conductor 76 and contact 116 to energize the motor control relay 98 through conductor 114 to start the seat motor 112 to turn in the desired direction.

As has been previously mentioned, when either of the seat backs is tilted forwardly, the seat motor 112 moves the seat forwardly. As the seat moves forwardly to its forward limit position, lug 146 on the upper track 32 will engage the contact of the normally closed forward limit switch 144 to open the switch and thereby deenergize the coil 78 of the seat back controlled relay to allow armature 80 to be extended and break the circuit between conductor 76 and contact 116 and thereby deenergize the motor control relay 98 to stop the seat motor 112. The seat will remain in this forward limit position regardless of whether either vehicle door is opened until the seat back is again moved to its normal upright position. Since both the right and the left hand seat back switches are in the circuit of the door controlled relay, movement of the doors to open position will not establish the circuit between the coil 84 of the door controlled relay 88 and the right and left hand door jamb switches as long as either or both seat backs remain in a forward tilted position.

As has been previously mentioned, in some current production vehicles the seat backs cannot be tilted forwardly until the doors are opened. If either of the doors is first opened and a seat back is then tilted forwardly, the seat will not move to its rearward limit position since the circuit will be interrupted by the forward tilting of either of the seat backs. However, when either or both seat backs is tilted forwardly the circuit will be completed to move the seat forwardly to allow the rear seat passenger to leave the vehicle. Thus, it can be seen that the rear seat passenger does not have to wait until the front seat reaches its rearward limit position before he can tilt a seat back to stop the rearward motion of the seat and energize the seat motor to move the seat forwardly.

Referring now to Figure 4 of the drawings, a modified circuit of a seat positioning mechanism will be described for use in conjunction with a six-way power seat of the type shown and described in application S. N. 501,246, filed April 5, 1955, John Himka, assigned to the assignee of the present invention. In this six-way power seat, the seat motor is connected to the seat adjuster mechanism through a lead screw and a plurality of nuts positioned on the lead screw and clutchable thereto. In order to impart movement to the seat, one of the nuts must be clutched to the lead screw, and this clutching is accomplished through a solenoid. Figure 4 shows a circuit for actuating a solenoid to clutch one of the nuts to the lead screw to impart horizontal forward and rearward movement to the seat. A conductor 184 extends from contact 186 to contact 188 and conductor 190 extends from conductor 184 to a solenoid 192 which is grounded. Other than this difference, the circuit is the same as has already been described. When the coil 84 of the door controlled relay 88 is energized to retract armature 86 and establish current flow between conductor 76 and contact 120, the solenoid 192 will be energized through contact 188, conductor 184, and conductor 190 so as to clutch the one nut to the shaft to impart rearward movement to the seat. Since the seat back controlled relay is not energized, there will be no current flow between conductor 76 and contact 186. If the coil 78 of the seat back controlled relay 82 is energized to retract armature 80 and establish current flow between conductor 76 and contact 186, solenoid 192 will be energized through conductors 184 and 190 to clutch the one nut to the shaft to impart forward movement to the seat.

It will be noted that when the seat positioning circuit shown in Figure 3 is not used in conjunction with a power operating mechanism including a solenoid nut clutchable to a lead screw, contacts 186 and 188 and conductor 184 are unnecessary in the circuit. Since the door controlled relay and the seat back controlled relay must be alternately and selectively energized, there is no current flow in conductor 184. However, if both types of power operating mechanism are in production, the one shown in application S. N. 395,822 using a motor driven screw jack assembly and the one shown in S. N. 501,246 using a motor driven lead screw and clutchable nut assembly, the circuit shown in Figure 3 can be used interchangeably and can, therefore, be mass produced.

The seat positioning mechanism of this invention can be used in conjunction with any vehicle seat which is power operated in horizontal directions. The seat may also be power operated in vertical directions, such as the four-way power seats which are power operated both horizontally forwardly and rearwardly and vertically upwardly and downwardly, and the six-way power seats which are power operated horizontally and rearwardly with the front and rear edges of the seat also being power operated vertically upwardly and downwardly. Although the seat positioning mechanism has been described in conjunction with both four-way and six-way power seats, it can also be applied to a two-way power seat which is power operated only horizontally forwardly and rearwardly, although it may be manually operated vertically or have no vertical adjustment.

The seat positioning mechanim of this invention is intended primarily for use in two-door style vehicle bodies since this type of vehicle usually employs a tilting split back seat. It can be seen that the seat positioning mechanism greatly facilitates entrance and exit of both front and rear seat passengers and also includes safety features which are necessary. Thus, whenever the ignition switch is in "on" position, it is impossible to actuate the circuit of the seat positioning mechanism to move the seat and thereby impede the efforts of the driver. Likewise, the seat motor cannot be operated by both the seat positioning mechanism circuit and the manual seat switch circuit since the ignition switch provides a lock out allowing selective and alternate operation of either circuit but preventing simultaneous operation.

While a specific embodiment of this invention has been shown and described, various changes and modifications may be made within the scope and spirit of the invention.

We claim:

1. In a vehicle body, the combination comprising, a door mounted on said body for swinging movement to open and closed positions, a seat structure mounted on said body for horizontal forward and rearward movement relative thereto and including a tiltable seat back, power operated means for moving said seat structure relative to said body, and control means responsive to swinging movement of said door and tilting movement of said seat back for controlling said power operated means, swinging movement of said door causing said seat structure to be moved in a horizontal rearward direction relative to said body and tilting movement of said seat back causing said seat structure to be moved in a horizontal forward direction relative to said body.

2. In a vehicle body, the combination comprising, a door mounted on said body for swinging movement to open and closed positions, a seat structure mounted on said body for horizontal forward and rearward movement relative thereto and including a seat cushion and a tiltable seat back movable from a substantially upright position to a position overlying said seat cushion, power operated means for moving said seat structure horizontally relative to said body, and control means responsive to swinging movement of said door and tilting movement of said seat back for controlling said power operated means, swinging movement of said door causing said seat structure to be moved in a horizontal rearward direction relative to said body and tilting movement of said seat back causing said seat structure to be moved in a horizontal forward direction relative to said body, said control means being responsive to swinging movement of said door only when said seat back is in said upright position.

3. In a vehicle body, the combination comprising, a door mounted on said body for swinging movement to open and closed positions, a seat structure mounted on said body for horizontal forward and rearward movement relative thereto and including a seat cushion and a tiltable seat back movable from a substantially upright position to a position overlying said seat cushion, power operated means for moving said seat structure horizontally relative to said body, and control means responsive to swinging movement of said door and tilting movement of said seat back for controlling said power operated means, swinging movement of said door causing said seat structure to be moved in a horizontal rearward direction relative to said body and tilting movement of said seat back causing said seat structure to be moved in a horizontal forward direction relative to said body, said control means being responsive to swinging movement of said door when said seat back is in said upright position and being responsive to tilting movement of said seat back when said door is in either of said positions.

4. In a vehicle body, the combination comprising, a door mounted on said body for swinging movement to open and closed positions, a seat structure mounted on said body for horizontal movement relative thereto between forward and rearward limit positions, power operated means for moving said seat structure relative to said body between said limit positions thereof, and control means responsive to movement of said door for controlling said power operated means whereby swinging movement of said door to open position will cause said power operated means to move said seat horizontally rearwardly to said rear limit position thereof from any position intermediate said forward and rearward limit positions to facilitate seat passenger exit.

5. In a vehicle body, the combination comprising, a door mounted on said body for swinging movement to open and closed positions, a seat structure mounted on said body for horizontal movement relative thereto between forward and rearward limit positions, power operated means for moving said seat structure relative to said body between said limit positions thereof, and control means responsive to movement of said door for controlling said power operated means whereby swinging movement of said door from closed to open position will cause said power operated means to move said seat horizontally rearwardly to said rear limit position thereof from any initial position intermediate said forward and rearward limit positions to facilitate seat passenger exit, swinging movement of said door from open to closed position being ineffective to return said seat structure to said initial position thereof.

6. In a vehicle body, the combination comprising, a door mounted on said body for swinging movement to open and closed positions, a seat structure mounted on said body for horizontal forward and rearward movement relative thereto and including a seat cushion and a tiltable seat back movable from an upright position to a position overlying said seat cushion, power operated means for moving said seat structure relative to said body, and control means responsive to swinging movement of said door and tilting movement of said seat back for controlling said power operated means, said control means being responsive to tilting movement of said seat back to cause said seat to be moved horizontally forwardly relative to said body regardless of the position of said door.

References Cited in the file of this patent

UNITED STATES PATENTS

| | | |
|---|---|---|
| 1,919,210 | Douglas | July 25, 1933 |
| 2,587,679 | Atkinson | Mar. 4, 1952 |
| 2,660,223 | Appleton | Nov. 24, 1953 |